2,831,822

PROCESS FOR PROLONGING THE FILM-FORMING LIFE OF A NORMALLY CRYSTALLINE POLYMER LATEX

Boyd H. Carr, Midland, Donald C. Doane, Beaverton, and Lloyd E. Lefevre, Bay City, Mich., assignors to The Dow Chemical Company, Midland, Mich., a corporation of Delaware No Drawing. Application September 23, 1953
Serial No. 381,972

6 Claims. (Cl. 260—29.6)

This invention relates to improvements in the film forming properties of latexes of polymers and copolymers. More specifically it relates to methods of prolonging the useful life of aqueous latex-like dispersions of normally crystalline polymers and copolymers.

Unsupported films prepared from normaly crystalline polymers and copolymers are very useful as packaging materials. For example, the films prepared from crystalline copolymers containing predominantly vinylidene chloride show a high resistance to the transmission of moisture vapor. However, it is difficult to prepare such films by conventional extrusion methods, because of the extreme sensitivity of such copolymers to heat. Likewise, the lack of suitable low boiling solvents for such copolymers precludes the usual solvent casting techniques. It would be desirable to cast such films from those aqueous latex-like dispersions of the copolymer which may be made by emulsion polymerization. It is well known that to be able to cast continuous coherent films from aqueous dispersions, the copolymer must be predominantly in the amorphous state. In the past, it was necessary to cast films from these dispersions shortly after they were prepared if continuous coherent films were desired. If crystallization of the copolymer was allowed to proceed even for a short time, the deposited film would dry into a flaky, discontinuous film that was useless for commercial purposes. It would be desirable to have a method for prolonging the amorphous life of a copolymer in an aqueous dispersion so that the dispersion could be stored or transported without crystallization taking place in amounts that would prohibit the formation of continuous, coherent films.

It is therefore an object of this invention to provide a process for prolonging the amorphous life of a freshly prepared latex of a normally crystalline copolymer.

The above and related objects are accomplished by a process consisting of incorporating certain volatile organic solvents into the aqueous dispersion of the polymer before crystallization has advanced to the point where the latex will not form a film. Thus, the solvents may be incorporated into the dispersion prior to polymerization or shortly after polymerization has been completed. The solvents need not be so powerful as to completely dissolve the polymer, but must at least exert a swelling effect on the polymer.

As polymeric materials any polymer compositions that crystallize from the amorphous state may be used. Polymers and copolymers in which the major polymerized constituent is vinylidene chloride fall in this class and are preferred.

The formation of aqueous dispersions, such as latexes, of polymeric materials is well-known in the art. Typically, the monomeric materials are introduced into an aqueous phase containing a water soluble polymerization catalyst such as potassium persulfate, and a surface active agent capable of emulsifying the polymerizable substances. Examples of suitable emulsifiers are the soluble salts of long chain alkyl sulfates or sulfonates or petroleum hydrocarbon sulfonates or the like. The polymerization is usually carried out by heating the aqueous emulsion of said mixture at temperatures between 40° and 60° C. with initial agitation. After polymerization is complete the resulting latex is filtered to remove any precoagulum.

It is preferred to use a latex containing from 35 to 50 percent polymer solids. When less than 30 percent solids are present in the latex, no useful films may be formed, regardless of the degree of crystallinity in the polymeric particles. When the solids are appreciably above 50 percent, the latex becomes extremely sensitive to mechanical working and may coagulate prematurely.

The polymer in a normally crystalline latex is predominantly non-crystalline for the first few hours of its life. During this period continuous, coherent films may be cast from the latex without the modification of this invention. However, when it is desired to store or to ship such latexes, they gradually become more crystalline. When more than half of the polymer is crystalline no useful film is obtained. When the latexes are treated according to the method of this invention, the useful life of the latex is extended because the tendency to crystallize is inhibited.

The quality of the dried film is also dependent on the particle size of the latex. The particle size is known to be a function of the emulsifier used and of the temperature employed during polymerization, and a latex of a normally crystalline polymer will not form a film unless substantially all of the particles are under 2000 Angstrom units in diameter. Most desirable results are obtained when the majority of the dispersed polymer particles have diameters between 400 and 1200 Angstrom units.

As suitable materials to be used in accordance with this invention are volatile organic solvents which are preferably miscible with the monomer. For purposes of this application, the term volatile solvents may be construed as including those solvents which are at least as volatile as water, i. e. whose vapor pressures are at least as great as that of water at the prevailing temperature. It should be apparent that solvents for the monomer which cause degradation or decomposition of the polymer should not be used. For example, when polymers high in vinylidene chloride are used, most amines and other strongly alkaline agents are unsuitable.

The solvents may be incorporated at any time before substantial crystallization of the polymer molecules has occurred to render the polymer latex non-film forming. An especially suitable method is to mix the solvent with the monomer prior to polymerization. This method provides easier and more complete distribution of the solvent throughout the polymer particles. Since the solvents should not adversely affect the polymerization or the polymer formed, phenol or other known inhibitors for the polymerization of halo-substituted monomers, and substances which coagulate the latex, such as some ketones, cannot be used.

The amounts of the solvents that must be used to achieve the highly useful results are greater than 2 percent of the polymer solids in the latex. It is preferred to use from 2 to 10 percent. Smaller amounts do not inhibit the crystallization process. Larger amounts either tend to coagulate the latex or to alter the properties of the dried film. It is possible to use a mixture of the solvents.

It is desirable to add small amounts of a thickening agent together with the solvents. Such agents tend to hold the solvents within the polymer, and are helpful in prolonging the useful amorphous life of the polymer. No effect on the amorphous life of the polymer is noticeable by adding such thickening agents alone. Examples of suitable and well known thickening agents are methyl cellulose, Irish moss, karaya gum, and the like.

The amounts of thickening agents that may be used to achieve the improved results will vary depending on the solvent used and the emulsifier system used. The preferred amount of such agents is from 0.2 to 1.0 percent, based on the weight of solids in the latex.

The method of the invention will be more apparent from the following examples which are intended to be illustrative only.

*Example 1*

A latex of a copolymer consisting of 97 parts vinylidene chloride and 3 parts acrylonitrile was prepared as follows: Weighed amounts of the above monomers were introduced into an aqueous phase containing 3 parts of a sodium alkyl sulfate as a wetting agent, 0.1 part of potassium persulfate as a catalyst and .3 part of ammonium carbonate as a buffer in 100 parts of water. As a volatile solvent for the monomers and copolymer, 3.0 parts of tetrahydrofuran were added to the charge. The polymerization was carried out with agitation for 4.5 hours at 65° C. at which time 90 percent of the monomers had been polymerized. The latex was filtered and 2 parts of sodium alkyl aryl sulfonate added to stabilize the latex to mechanical handling. 0.2 part of a low viscosity methyl cellulose was added. It was found that this latex would still form films after standing for 39 days.

Similar effects were noticed when either methanol, ethanol, isopropanol, or dioxane was used in place of tetrahydrofuran.

By way of contrast when the same latex was prepared without the tetrahydrofuran but formulated in the same manner, the latex would not form a continuous film after 15 days.

*Example 2*

A similar latex of normally crystalline vinylidene chloride-vinyl chloride copolymer was made, without adding a volatile solvent to the monomer charge. It would form films only for the first 24 hours of its life. When 5 percent, based on the weight of copolymer, of carbon tetrachloride was stirred into a batch of the fresh latex, however, it retained its film-forming, amorphous characteristics for at least 4 days.

When the solvents mentioned in Example 1 and in addition other halogenated hydrocarbons such as methylene chloride, chloroform and ethylene chloride were substituted for the carbon tetrachloride, similar results were obtained.

We claim:

1. A method for prolonging the film-forming life of a latex of a normally crystalline vinylidene chloride polymer which latex normally is capable of depositing coherent films when fresh and loses that ability on ageing, which comprises adding to the latex within 24 hours after polymerization is complete from 2 to 10 percent based on the weight of dispersed polymer solids of a halogenated hydrocarbon solvent which is at least as volatile as water.

2. The method claimed in claim 1 wherein said halogenated hydrocarbon is a halogenated aliphatic hydrocarbon.

3. The method claimed in claim 2 wherein said halogenated aliphatic hydrocarbon is carbon tetrachloride.

4. The method claimed in claim 2 wherein said halogenated aliphatic hydrocarbon is methylene chloride.

5. The method claimed in claim 2 wherein said halogenated aliphatic hydrocarbon is chloroform.

6. The method claimed in claim 2 wherein said halogenated aliphatic hydrocarbon is ethylene chloride.

References Cited in the file of this patent

UNITED STATES PATENTS

| | | |
|---|---|---|
| 2,593,236 | Young | Apr. 15, 1952 |
| 2,599,300 | Upson | June 3, 1952 |
| 2,662,867 | Hoertz | Dec. 15, 1953 |

FOREIGN PATENTS

| | | |
|---|---|---|
| 123,501 | Australia | Feb. 20, 1947 |